(12) United States Patent
Ellison et al.

(10) Patent No.: US 8,122,514 B2
(45) Date of Patent: Feb. 21, 2012

(54) SOFTWARE ENHANCED TRUSTED PLATFORM MODULE

(75) Inventors: Carl Melvin Ellison, Seattle, WA (US); John M. Parchem, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 808 days.

(21) Appl. No.: 12/183,057

(22) Filed: Jul. 30, 2008

(65) Prior Publication Data

US 2010/0031370 A1    Feb. 4, 2010

(51) Int. Cl.
*G06F 21/02* (2006.01)
(52) U.S. Cl. .............................. 726/27; 726/26; 711/163
(58) Field of Classification Search .................. None
See application file for complete search history.

(56) References Cited

U.S. PATENT DOCUMENTS

| | | |
|---|---|---|
| 7,330,981 B2 | 2/2008 | Willman |
| 2003/0163711 A1 | 8/2003 | Grawrock |
| 2005/0033980 A1 | 2/2005 | Willman et al. |
| 2005/0234861 A1* | 10/2005 | Ingels et al. ............... 707/1 |
| 2005/0289347 A1 | 12/2005 | Ovadia |
| 2006/0020781 A1 | 1/2006 | Scarlata et al. |
| 2006/0026423 A1 | 2/2006 | Bangerter et al. |
| 2006/0075223 A1 | 4/2006 | Bade et al. |
| 2006/0112420 A1 | 5/2006 | Challener et al. |
| 2006/0212939 A1 | 9/2006 | England et al. |
| 2006/0242428 A1 | 10/2006 | Tarkkala |
| 2007/0006306 A1 | 1/2007 | Seifert et al. |
| 2007/0226505 A1* | 9/2007 | Brickell ........................ 713/176 |
| 2008/0016313 A1* | 1/2008 | Murotake et al. ............. 711/173 |

OTHER PUBLICATIONS

"Trusted Platform Modules Strengthen User and Platform Authenticity Jan. 2005", Trusted Computing Group, 2005, pp. 1-8.
Berger, et al., "vTPM: Virtualizing the Trusted Platform Module", Feb. 14, 2006, IBM Research Report, pp. 17.
Garfinkel, et al., "Terra: A Virtual Machine-Based Platform for Trusted Computing", ACM SIGOPS Operating Systems Review, vol. 37, No. 5, 2003, ACM, pp. 14.
"TCG Software Stack (TSS) Specification Version 1.2 Level 1", Mar. 7, 2007, Trusted Computing Group, 2007, pp. 1-757.

* cited by examiner

*Primary Examiner* — Minh Dinh
*Assistant Examiner* — Venkat Perungavoor (57) ABSTRACT

Computer-executable instructions can implement a software-based Trusted Platform Module (TPM) that can have more computational power than the hardware TPM. The software TPM can be protected from modification, or other unauthorized access, via a memory partitioning scheme that enables other computer-executable instructions to access the software TPM in a predefined manner, but yet prohibits other access. A tri-partied partitioning scheme can be used wherein the computer executable instructions of the software TPM reside in a first region, a jump table to appropriate ones of those instructions resides in a second region, and everything else resides in the third region. The storage key of the software TPM can be sealed by the hardware TPM to be released only if the software TPM, and the computing device, are in a known good state, as determined by the Platform Configuration Registers of the hardware TPM, thereby further protecting the software TPM from tampering.

17 Claims, 4 Drawing Sheets

SOFTWARE ENHANCED TRUSTED PLATFORM MODULE

BACKGROUND

The process of booting a computing device prepares the computing device to perform useful tasks under control of an operating system. The initial application of power to the electronic circuitry of a computing device generally only renders the computing device capable of performing rudimentary tasks, such as fetching instructions embedded into hardware components of the computing device. Thus, the boot process executes those instructions, and initiates processes that enable a computing device to perform more complex tasks. However, because the boot process performs operations prior to the execution of the operating system and any other software whose execution utilizes the operating system, malicious code executed during the boot process can remain undetected but can affect the ongoing execution properties of the system.

To provide protection against malicious code, the notion of a "trusted computer" was developed whereby the state of the computing device could be ascertained. To that end, a "Trusted Platform Module" (TPM) chip was added to the computing device, which could maintain values in a secure manner and, thereby, be used to ascertain if the computer had booted properly. In particular, the TPM chip comprises registers known as "Platform Configuration Registers" (PCRs) that store values that uniquely identify measurements of the system that have been taken since power was applied to the circuitry of the computing device. These measurements are indicative of the software that is executed during the boot process and of the presence and configuration of various hardware components. If the proper measurements were made in the correct order, then the PCRs of the TPM would contain values that could be used to verify that the computing device did indeed boot in a recognizable way. If the measurements are recognized to represent a computer that has booted in a trusted way, then the machine is in a trusted state when it begins executing the operating system software. In such a manner, malicious code in the boot sequence can be detected.

The measurements that are made during the boot process, and the resulting values stored in the PCRs of the TPM, can define the trust state of the machine. As such, those PCR values can be utilized as part of the "attestation" and "sealing" mechanisms that can be performed by the TPM. "Attestation" generally refers to the provision of signed versions of one or more PCR values to an external entity so as to prove that the computing device is in a trusted state. Specifically, one or more PCR values are signed by the TPM using its private key and then transmitted to an external entity. The external entity can verify that the PCR values did indeed come from the indicated computing device, based on the fact that the PCR values were signed with the TPM's private key, and can further verify, based on the values of the PCRs themselves, that the computing device was placed into a trusted state. "Sealing", on the other hand, refers to the retention of a secret, by the TPM, which should only be released by the TPM if the values of relevant PCRs are the same as they were when the secret was provided to the TPM to be "sealed."

Unfortunately, not all measurements taken during the booting of a computing device comprise an equivalent security risk. Thus, using the TPM to verify all of the instructions executed during the booting of a computing device can complicate the evaluation of the trusted state of the computing device beyond what it reasonably needs to be. As a result, deviations that would otherwise be insignificant can, instead, result in a determination that the computing device is not in a trusted state. For example, the order in which some components are executed may be irrelevant and, consequently, there may not exist a precise control mechanism by which their execution order is controlled. If the order in which such components are executed changes, the values of one or more PCRs, as maintained by the TPM, may likewise change. As a result, secrets that were sealed by the TPM based on a particular set of PCR values will now no longer be unsealed, even though the state of the computing device has not materially changed. Similarly, attestation to an external entity may also fail, since the PCR values attested to by the TPM differ from those believed, by the external entity, to be indicative of a trusted state of the computing device.

As described above, the mechanisms of attestation and sealing are "fragile" because they can easily cause secrets to remain sealed, or computing devices to be found not in a trusted state, despite no valid security reason for doing so. To provide more rigorous attestation and sealing mechanisms, the concepts of "generalized attestation" and "generalized sealing" have been developed. Unlike the sealing described above, generalized sealing does not seal a secret to a precise and immutable set of PCR values, but rather seals the secret to one or more policies that can be verified through a range of PCR values. Similarly, unlike the attestation described above, generalized attestation enables the trusted state of a computing device to be verified by reference to one or more policies that can be expressed via a range of PCR values.

In the generalized attestation and generalized sealing mechanisms, logs of hashes are referenced, rather than individual PCR values. More specifically, in addition to, or as an alternative to, maintaining the PCR values in the manner described above, the TPM can also maintain one or more lists, or logs, of values uniquely identifying each component of the computing device that was utilized or executed during the boot process. Typically such uniquely identifying values will be hash values obtained by hashing some or all of the component utilized or executed.

During the generalized attestation and generalized sealing mechanisms, these logs of hashes are simplified and then referenced according to one or more policies. In particular, larger systems, such as an operating system, or a set of graphics drivers can comprise multiple components. When referencing the log of hashes of components utilized or executed during the boot process, the hash value of a component known to be part of a larger system, such as an operating system, or a set of graphics drivers, can be replaced by an identifier of the larger system, such as the name of the operating system or the set of graphics drivers. Ultimately, the log of hashes of components utilized or executed during the boot process can be pared down to a list comprising multiple entries identifying larger systems, such as an operating system or a set of graphics drivers and some, or possibly even no, hashes. Generalized attestation and generalized sealing can then be performed based on whether the few, or no, remaining hashes, and the listed larger systems, are trusted. Because individual components of larger systems are ultimately pared down to merely an indication of the larger system, the precise order of execution of each of those components during the boot process need not influence the determination of whether the computing device is in a trusted state.

Unfortunately, TPMs represent a hardware cost to the manufacturer of the computing device that the manufacturer cannot easily recoup. Consequently, manufacturers have selected very inexpensive TPMs that comprise very little computational ability, as compared to modern processors and other processing components of a computing device. In particular, the inexpensive TPMs selected do not comprise sufficient computational ability to perform a policy-based evaluation of a log of hashes of components utilized or executed during the boot process. Consequently, the hardware TPM cannot, by itself, perform the TPM-specific portions of either the generalized attestation mechanisms or the generalized sealing mechanisms.

SUMMARY

Trusted Platform Module (TPM) functionality can be implemented via computer-executable instructions that can be executed after power is applied to the computing device, thereby creating a "software TPM". Such a software TPM can utilize the computational abilities of the computing device, which can substantially exceed those of the hardware TPM by itself. Consequently, the software TPM can provide support for more computationally expensive, but more robust, mechanisms such as generalized attestation mechanisms and generalized sealing mechanisms.

In one embodiment, the software TPM can be protected through a tri-partied memory segmentation that can enable other software to access features of the software TPM without obtaining further information regarding the software TPM or editing any aspect of the software TPM. In particular, a first region of memory can comprise the computer-executable instructions of the software TPM, a second region of memory can comprise pointers to appropriate sections of the first region, and a third region of memory can comprise other computer-executable instructions, such as, for example, the operating system of the computing device, or other software applications. To protect the software TPM, computer-executable instructions executing from the third region of memory can be limited to execute-only access in the second region, and can be limited to no access in the first region. Similarly, computer-executable instructions executing from the second region of memory can be limited to execute-only access in all of the memory regions, including the first region of memory.

In another embodiment, a variant of a tri-partied memory segmentation can be utilized to enable access to features of the software TPM while protecting the software TPM. Specifically, overlap regions can exist between the first and second regions of memory and between the second and third regions of memory, with each overlap region comprising read and execute access, but not write access. In such a manner, computer-executable instructions executing from one region of memory can call or jump into the shared region and thereby accomplish a transfer from one region to another region. Of particular relevance to the software TPM, computer-executable instructions executing in the lowest-priority third region of memory can jump into the higher priority second region of memory and, from there, jump into the highest priority first region of memory to invoke a desired feature of the software TPM, whose computer-executable instructions can be in the first region of memory.

In a further embodiment, a tri-partied memory segmentation scheme can be implemented, or enforced, by dedicated hardware, such as a hardware memory management unit. The dedicated hardware can prevent direct memory access to protected regions, such as the higher priority first and second regions, when the direct memory access request originates from computer-executable instructions executing from the lower priority third region of memory. Additionally, attempts to modify definitions of the memory regions or the memory page tables or specific registers associated with the memory page tables from outside of the first region of memory can trap to computer-executable instructions within the first region of memory, thereby limiting such modifications to computer-executable instructions executing from the first region of memory.

In a still further embodiment, the software TPM and associated memory protection schemes can utilize aspects of the hardware TPM to provide for greater security and trustworthiness. In particular, the software TPM's storage key can be sealed by the hardware TPM such that it will only be provided to the software TPM when some or all of the computing device is in a trusted state, as determined by the values of the hardware PCRs maintained by the hardware TPM. The hardware TPM can be responsible for providing the software TPM's storage key to the software TPM, and can, thereby, prevent the software TPM from performing useful tasks, unless the hardware PCRs maintained by the hardware TPM indicate that the computing device, including the computer-executable instructions that comprise the software TPM and the computer-executable instructions and hardware components that implement and enforce an associated memory protection scheme, have not been modified or otherwise tampered with. After the software TPM has been executed and has received its storage key from the hardware TPM, it can perform TPM-centric duties, including maintaining appropriate databases that can be utilized as part of a generalized attestation or a generalized sealing process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of a software-implemented Trusted Platform Module (TPM) through memory partitioning schemes that protect the computer-executable instructions that comprise the software TPM from modification or other improper access. The software TPM can utilize the processing power of the computing device to participate in more computationally expensive processes, such as generalized attestation or generalized sealing processes. A tri-partied memory partitioning scheme can protect the software TPM, whose associated computer-executable instructions can be executed in a first, high priority, memory partition. A second, lower priority, memory partition can comprise an indirection table, or jump table, referencing specific portions of the computer-executable instructions of the software TPM in the first memory partition. A third, even lower priority, memory partition can comprise any other computer-executable instructions, such as the operating system of the computing device, and any software applications being executed on the computing device. In other embodiments, the third memory partition can be further partitioned to implement similar protections for other computer-executable instructions. To protect the software TPM, computer-executable instructions executing in the third memory partition can be prevented from reading, writing, or executing the computer-executable instructions of the software TPM in the first memory partition. However, computer-executable instructions executing in the third memory partition can jump into the second memory partition and from there access predetermined features of the software TPM in a secure manner.

The techniques described herein focus on the usage of tri-partied memory partitioning schemes to implement and protect a software TPM. However, the teachings below are equally applicable to other memory partitioning or protection mechanisms directed to the prevention of tampering or other unauthorized access of the computer-executable instructions that comprise the software TPM. Consequently, the descriptions below are not meant to limit the enumerated embodiments to the specific memory partitioning mechanisms referenced.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

Figure 1:
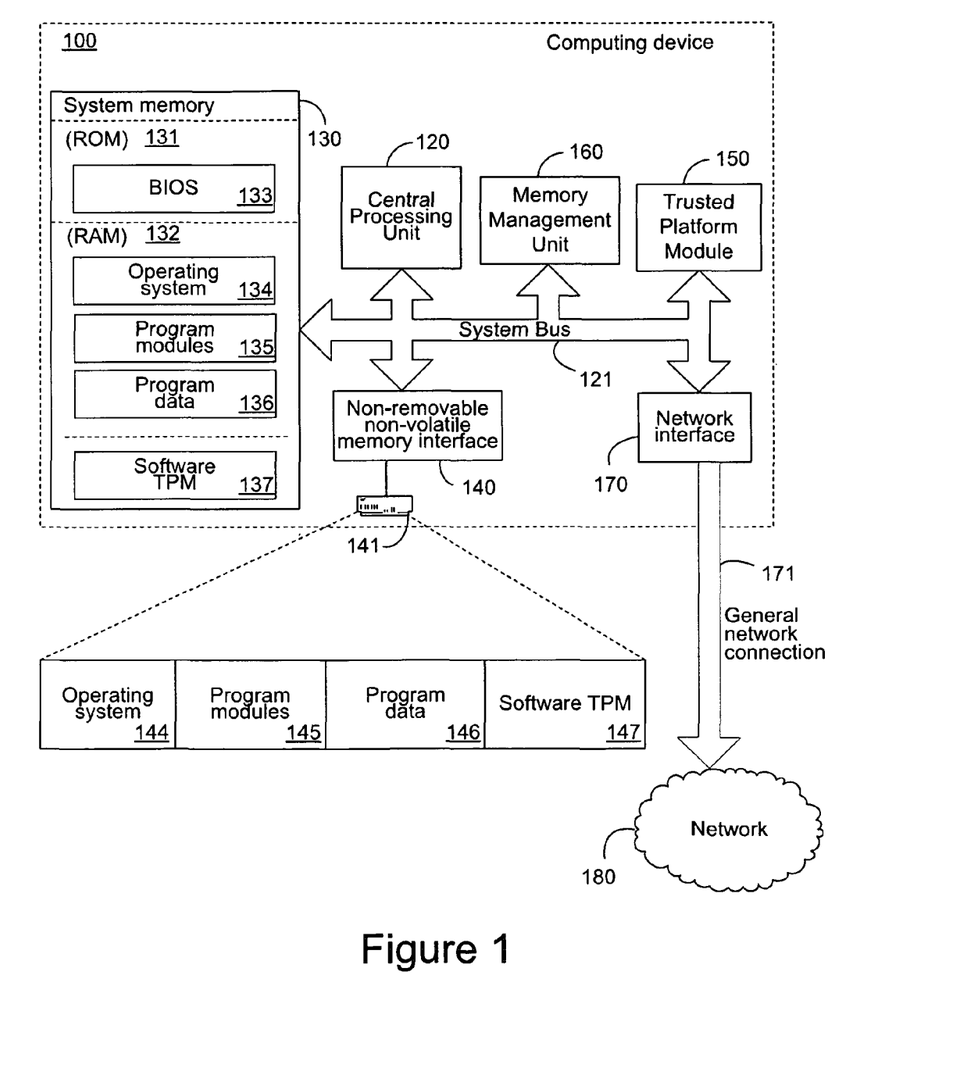
FIG. 1 is a diagram of an exemplary computing device comprising elements for implementing a secure software TPM.

With reference to FIG. 1, an exemplary computing device 100 is illustrated, comprising, in part, hardware elements referenced further in the methods described below. The exemplary computing device 100 can include, but is not limited to, one or more central processing units (CPUs) 120, a system memory 130, one or more hardware memory management units 160 for managing the system memory, a hardware Trusted Platform Module (TPM) 150, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130, the memory management units 160 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The TPM 150 can comprise encryption keys for the encryption and decryption of information provided to it and it can further store values such that they are protected by the hardware design of the TPM 150 itself. In addition, the TPM 150 can comprise Platform Configuration Registers (PCRs) that can securely store data provided to the TPM 150 by the CPU 120 via the system bus 121. In some embodiments, only specific code executed by the CPU 120 would be permitted to send data to the TPM 150 that would modify the values stored in the PCRs.

Traditionally, as will be known by those skilled in the art, when the computing device 100 is powered on or reset, the TPM 150 can begin receiving measurements that it can use to extend one or more PCRs. The initial measurement can be provided by a particular component of the computing device 100 known as a Core Root of Trust for Measurement (CRTM) that can be part of the BIOS 133, described further below. The CRTM can measure the next component to be utilized or executed and provide the measured value to the TPM 150, which the TPM can use to extend one or more PCRs. That measured component can then, upon utilization or execution, measure the next component to be utilized or executed and can, likewise, provide that measured value to the TPM 150, which the TPM can also use to extend one or more PCRs. In such a manner, the PCRs of the TPM 150 can comprise values that are unique to the state of the computing device 100, since they can be constructed from measured values of all of the components utilized or executed since the computing device was powered on or reset.

In addition to the elements described above, the computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100 and the CRTM, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136 as being resident in the RAM 132.

Traditionally, RAM 132 is utilized by the computing device 100 to implement a virtual memory system whose capacity exceeds that of the physical RAM 132. Such a virtual memory system can, in part, be managed by memory management units 160, which can control and prevent access to specific portions of virtual memory and corresponding portions of the physical RAM 132. For illustration, RAM 132 is shown as having a protected portion comprising computer-executable instructions for a software TPM 137. Such a portion can be implemented and protected by one or more of the memory management units 160 either operating alone or in combination with computer-executable instructions, such as can be stored in the ROM 131.

The computing device 100 may additionally include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, program data 146, and, optionally, the computer-executable instructions for the software TPM 147. Note that these components can either be the same as or different from operating system 134, other program modules 135 program data 136 and the software TPM 137. Operating system 144, other program modules 145, program data 146, and the software TPM 147 are given different numbers hereto illustrate that, at a minimum, they are different copies.

Figure 2:
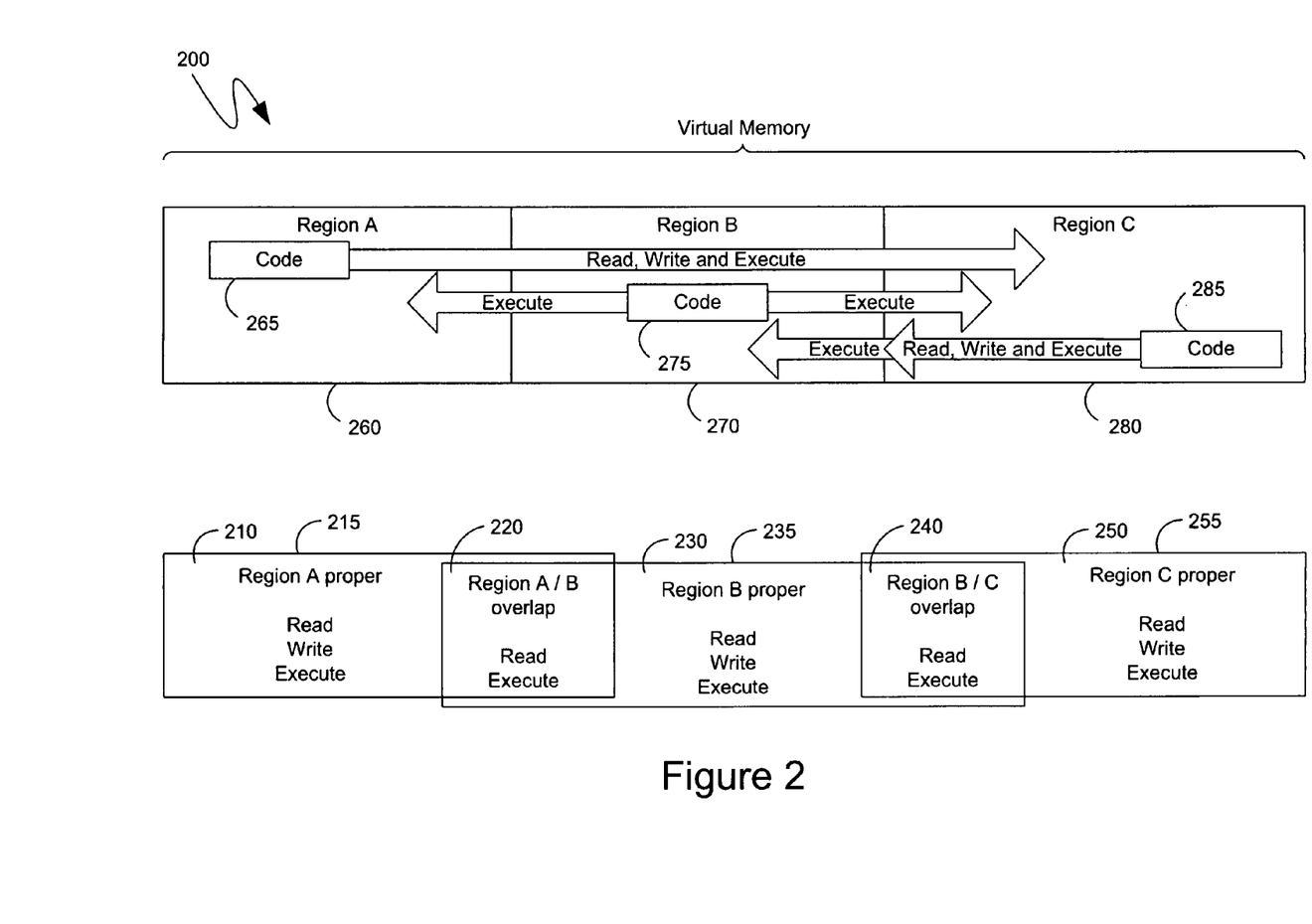
FIG. 2 is a block diagram of an exemplary divided memory structure for protecting a software TPM.

The interaction of the various components illustrated in FIG. 1, according to one embodiment, is described with reference to FIGS. 3 and 4, which illustrate various processes that can be performed while booting the computing device 100 of FIG. 1. Before describing such interaction, however, a description of a tri-partied virtual memory segmentation scheme, according to one embodiment, is provided with reference to FIG. 2. Turning to FIG. 2, a memory segment diagram 200 is shown illustrating various virtual memory segmentation schemes contemplated by some of the embodiments described further below. For ease of illustration, the regions are illustrated as being contiguous, such that the beginning of a region occurs at a memory address immediately subsequent to the memory address at which a prior region ended. Also for ease of illustration, the regions are illustrated as being coherent, such that all memory addresses between the lowest address of a region and the highest address of a region are part of the region. However, the mechanisms described below do not require the regions of memory to either be contiguous or coherent. Thus, references to a region of memory are meant to refer to any collection of memory locations, including disjointed and distributed memory locations, so long as they can be treated as a single region of memory.

The memory segment diagram 200 comprises two different memory segmentation schemes that can segment the virtual memory into three regions, nominated "region A", "region B" and "region C". In one memory segmentation scheme, region A 260, region B 270 and region C 280 can comprise individual regions with no overlap between them. In such an embodiment, the access rights that computer-executable instructions can be granted can be dependent upon the region from which those computer-executable instructions are executing. In another memory segmentation scheme, region A can be divided into a region A proper 210 and an overlap region 220 that region A shares with region B. Similarly, region C can be divided into a region C proper 250 and an overlap region 240 that region C shares with region B. Region B, consequently, can comprise these two overlap regions 220 and 240 and also a region B proper 230. In such an embodiment, computer-executable instructions can be limited to have read, write and execute access only within their own region and can further be limited to only read and execute access rights in the overlap regions 220 and 240.

Turning to the memory segmentation scheme comprising region A 260, region B 270 and region C 280, computer-executable instructions executing from region A, nominated "code" 265 in FIG. 2 for notational convenience, can be granted read, write and execute access to all of region A, region B and region C, as illustrated in FIG. 2. Conversely, computer-executable instructions executing from region B 270, nominated "code" 275 in FIG. 2 for notational convenience, can be granted only execute access to all of region A 260, region B and region C 270. Finally, computer-executable instructions executing from region C 280, nominated "code" 285 in FIG. 2 for notational convenience, can be granted read, write and execute access to all of region C, but can be limited to only execute access within region B 270, and can be wholly prevented from accessing region A 260.

Region A 260, in one embodiment, can comprise the computer-executable instructions and data that can comprise the software TPM 137. Because code 285 from region C 280 can be prevented from accessing region A 260, and the code 275 from region B 270 can be prevented from reading or writing data in region A, the computer-executable instructions and data that comprise the software TPM 137 can be protected from unauthorized access. Instead, access to the computer-executable instructions and data that comprise the software TPM 137 can be accomplished through the execute access in region A 260 granted to code 275 executing from region B 270.

In particular, region B 270 can comprise a jump table, or other indirection device, that can provide for the execution of specific ones of the computer-executable instructions comprising the software TPM 137 that can be present in region A 260. Because code 275 from region B 270, such as the aforementioned jump table, can have execute access within region A 260, the jump table in region B can provide for the invocation of specific, accessible features and functionality of the software TPM 137 through the execution of specific ones of the computer-executable instructions that are a part of the software TPM. The code 285 of region C 280 can comprise any or all of the operating system 134 and other program modules 135, and such code can access specific, accessible features and functionality of the software TPM 137 through the jump table of region B 270.

For example, if the operating system 134 or one or more of the other program modules 135 from region C 280 sought to access some functionality of the software TPM 137, the accessing computer-executable instructions could initially execute jump table instructions from region B 270 since the accessing computer-executable instructions from region C have execute privileges in region B. Subsequently, the jump table instructions from region B 270 could access appropriate ones of the computer-executable instructions that comprise the software TPM 137 in region A 260 since, as indicated previously, code 275 from region B 270 has execute privileges in region A. In such a manner, the software TPM 137 in region A 260 can be protected from all of the computer-executable instructions in region C 280 while still allowing those computer-executable instructions to access functionality of the software TPM through the jump table in region B 270.

In another embodiment, also illustrated in FIG. 2, computer-executable instructions can be limited to accessing only the region from which they are executing. Consequently, to enable computer-executable instructions to, effectively, transfer regions, there can exist an overlap region 220 between region A 215, and region B 235. Similarly, an overlap region 240 can exist between region B 235 and region C 255. Region A 215, in addition to comprising the overlap region 220, also comprises a region A proper 210 which is not shared with any other region of memory. Similarly, in addition to comprising the overlap regions 220 and 240, region B 235 can also comprise a region B proper 230 that is not shared with any other region of memory, and region C 255 can, in addition to the overlap region 240, also comprise a region C proper 250 that is exclusively a part of region C.

In this second embodiment illustrated by FIG. 2, overlap regions 220 and 240 can enable access to predetermined functionality of computer-executable instructions residing in one region from another, different region. The overlap regions 220 and 240 can provide read and execute access, and, in such a manner, enable computer-executable instructions executing in one region to accomplish a transfer to another region. For example, computer-executable instructions executing in region C proper 250 can have access to the overlap region 240, since it is still part of region C 255, and can, thereby, execute computer-executable instructions that are also part of region B 235. Those computer-executable instructions executing in region B 235 can then, in turn, have access to the overlap region 220, and can, thereby read data or execute computer-executable instructions that are also part of region A 215.

In one embodiment, some or all of the computer-executable instructions that comprise the software TPM 137 can execute from region A 215. For example, data that is to be accessible only by the software TPM 137 can be retained in region A proper 210, where only other computer-executable instructions executing from region A 215 can have read, write and execute access. Computer-executable instructions executing from another region can be prevented from reading, writing, executing, or otherwise accessing region A proper 210. Additionally, for example, computer-executable instructions that can implement some or all of the functionality of the software TPM 137 can be retained in the overlap region 220 such that they can be executed from region B 235. In such a manner, computer-executable instructions executing in region B 235 can invoke the computer-executable instructions of the software TPM 137 in region 220 to perform TPM functions, including aspects of generalized attestation and generalized sealing. However, the computer-executable instructions executing from region B 235 can be prevented from writing data in the region 220, thereby preserving the integrity of the computer-executable instructions of the software TPM 137.

The computer-executable instructions of the operating system 134 and other program modules 135 can all reside in region C proper 250. As such, in one embodiment, no aspect of the operating system 134 or program modules 135 can directly read, write, execute, or otherwise directly access data retained by the software TPM 137 in region A proper 210 or the computer-executable instructions of the software TPM in the region A/B overlap 220. Instead, a jump table, or similar listing, can be stored in region B 235 and, more specifically, in the overlap region 240 shared by both region B and region C 255. The computer-executable instructions executing in region C proper 250 can have read and execute access to the region B/C overlap 240 and, consequently, can access the jump table and invoke those features of the software TPM 137 that are referenced in the jump table.

When computer-executable instructions executing from region C 255 access the jump table in the overlap region 240, they can initiate, from region B 235, the execution of specific computer-executable instructions that are part of region A 215. More particularly, the jump table in region B 235, and more specifically, the overlap region 240, can comprise pointers to specific computer-executable instructions in region A 215 and more specifically, the overlap region 220, that can perform specific functions of the software TPM 137. Computer-executable instructions executing from region C 255 accessing the jump table in the overlap region 240 can, in essence, accomplish a limited change of region to region B 235. From region B 235, the computer-executable instructions performing specific functions of the software TPM 137, that can be in the overlap region 220, can be read and executed, as indicated by the rights available in the overlap region 220. However, as indicated, they can be protected from modification by not allowing any write access to the overlap region 220.

The jump table, in overlap region 240, can be similarly protected from modification by enabling computer-executable instructions executing from either region B 235 or region C 255 to have read and execute access to the overlap region 240, but preventing them from having any write access to that region. Additionally, because computer-executable instructions executing from region C 255 can be prevented from having any access, read, write, execute, or otherwise, to region A 215 and the portion of region B 235 that does not overlap with region C, namely region B proper 230. In such a manner, the computer-executable instructions and data of the software TPM 137 in region A 260, and the jump table, or other indirection to the computer-executable instructions of the software TPM can be protected from modification by any external entity since, as indicated, in one embodiment the operating system 134, program modules 135 and other executable content executing on the computing device 100 can all be executed from region C.

In one embodiment, the above described three regions of memory can be implemented, and the access restrictions between them can be maintained, by computer-executable instructions that can execute at an early stage of the booting process of the computing device 100. For example, the BIOS 133, or other computer-executable instructions stored in the ROM 131 can implement the memory segmentation described. Such computer-executable instructions can establish traditional page tables such that computer-executable instructions executing in different regions are provided different page tables. In such an embodiment, instructions and registers, such as the well-known CR3 register, that can provide for the selection of a page table to be used, can be limited to being invoked or modified only by computer-executable instructions executing from the same region as the software TPM 137.

In an alternative embodiment, some or all of the implementation and maintenance of the above described three regions of memory can be performed with the aid of hardware elements, such as memory management units 160. For example, the access restrictions between the regions of memory, as described, can be implemented by one or more memory management units 160, which, as will be known by those skilled in the art, can be designed to prevent Direct Memory Access (DMA) requests from one region of memory into another and otherwise enforce divisions between defined segments of memory. In one embodiment, the memory management unit 160 utilized to prevent access across memory regions, in the manner described above, can be a memory management unit traditionally provided with a computing device, such as computing device 100. In another embodiment, the memory management unit 160 utilized to enforce the described memory segmentation and protection can be an Input/Output Memory Management Unit (IOMMU) which, as will be known to those skilled in the art, can provide memory management functionality between a device and the system memory 130.

The above-described memory segmentation schemes, because they segment virtual memory, as opposed to physical memory, can be further implemented, on a smaller scale, intra-process. For example, the segmentation of virtual memory into region A 260, region B 270 and region C 280, as described above, can be repeated with respect to a section of the virtual memory of region C that can be assigned to a process that may have need of such protection schemes. In such a case, the virtual memory of region C 280 assigned to that process can itself be partitioned into, for example, three regions, in an analogous manner to those described above. That process can then instantiate its own "software TPM", analogous to the software TPM 137, or other data or code that needs to be protected, into a first of the three regions and that region, within the process, can be protected from unauthorized access in the same manner as described above. For example, a virtual machine process executing within region C 280 can partition the virtual memory assigned to it in the manner described above in order to provide software TPMs to the operating system executed by such a virtual machine.

Returning to the above-described embodiments, the computer-executable instructions that comprise the software TPM 137, together with the data that comprises the jump table, entry table, or similar structure, can be measured prior to being loaded into the system memory 130, and such measurements can be provided to the hardware TPM 150. Measurements of the memory management units 160 or other mechanism used to create the memory divisions described above, and enforce the access restrictions between them, can likewise be measured and such measurements can also be provided to the hardware TPM 150. In a manner well known to those of skill in the art, the hardware TPM 150 can extend one or more of its PCRs with the provided measurements. The values of those PCRs can be utilized to determine if any change had been made to any of the above listed components of the software TPM system. If no such change is detected, then the software TPM components can be found to be in a trusted state and the software TPM 137 can be utilized to perform functions, such as those associated with generalized attestation and generalized sealing, that the hardware TPM 150 may not be capable of performing due to, for example, insufficient processing power.

Figure 3:
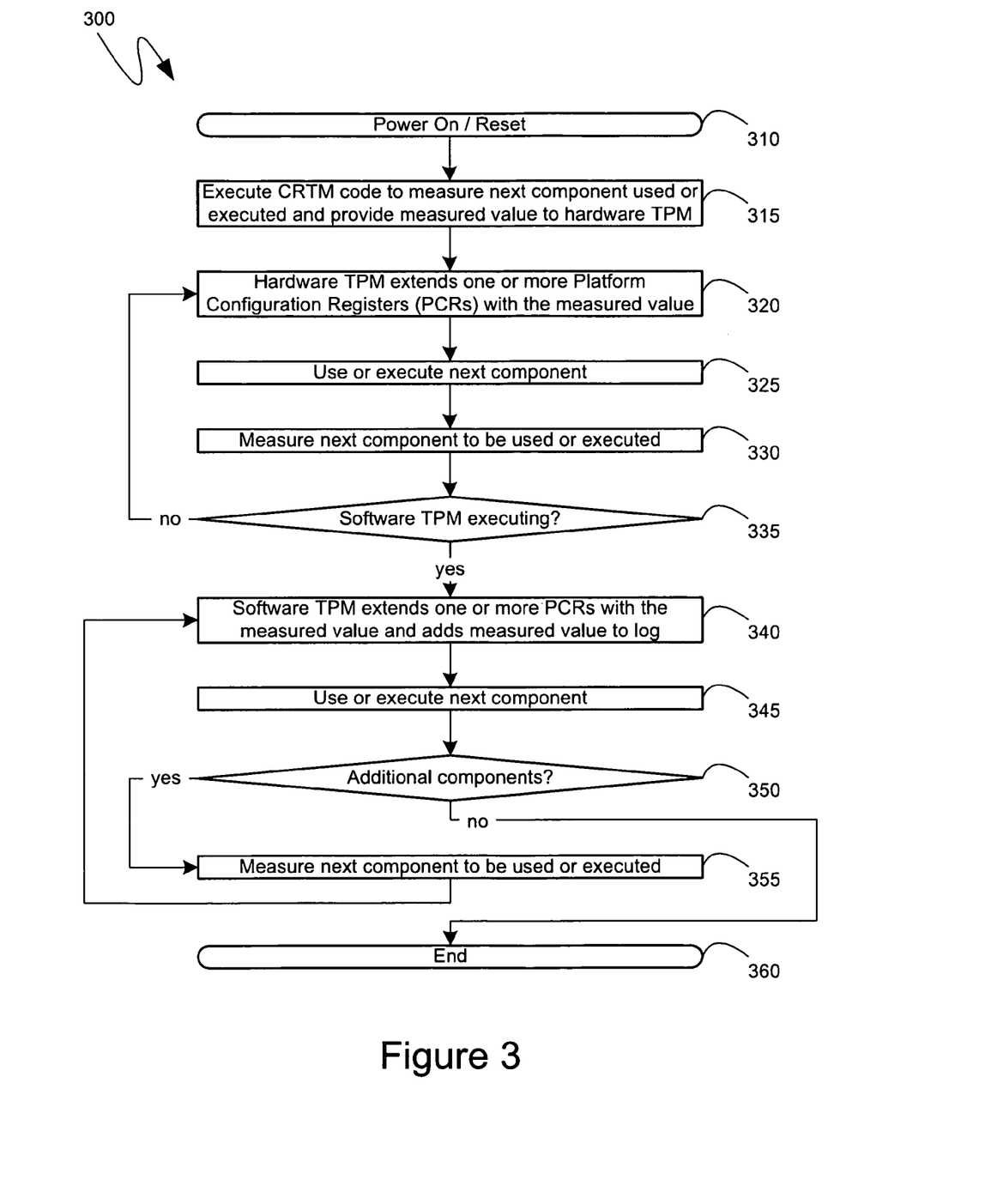
FIG. 3 is a flow diagram of an exemplary secure booting process utilizing a software TPM.

Turning to FIG. 3, flow diagram 300 illustrates portions of an exemplary booting process according to one embodiment where use of the hardware TPM 150 can be transitioned to the software TPM 137. As shown, initially, at step 310, the computing device 100 can receive power or otherwise be reset. Subsequently, at step 315, an initial set of computer-executable instructions can be executed to measure the next component used or executed as part of the booting of the computing device 100 and to provide that measured value to the hardware TPM 150. As will be known to those skilled in the art, such an initial set of computer-executable instructions can be known as the Core Root of Trust for Measurement (CRTM). In one embodiment, the CRTM can be part of the BIOS 133, or can otherwise be resident in the ROM 131, and can be executed, such as at step 315, to initiate measuring of the components utilized or executed during the booting of the computing device 100.

At step 320, the hardware TPM 150 can extend one or more PCRs with the measured value provided to it in the prior step. As will be known to those of skill in the art, in one embodiment, the "extension" of a PCR can comprise the addition of the measured value to the prior value of the PCR and then a hashing of the resulting sum. Concurrently with step 320, or after it, at step 325, the measured component can be utilized or executed as part of the booting process of the computing device 100. As part of the utilization or execution of that component at step 325, that component can, at step 330, measure the next component to be used or executed. In such a manner, each component that is utilized or executed during the booting of the computing device 100 can be measured by the utilization or execution of a prior component, that was itself measured. Each of the measured values can be provided to the hardware TPM 150, enabling the hardware TPM to extend one or more PCRs with the measured values. The PCR values, thereby, can uniquely represent the state of the computing device 100 after utilization or execution of all of the measured components.

As will be described further below, at some point during the booting of the computing device 100, the software TPM 137 can begin executing on the computing device. At such a time, TPM functionality can be performed by the software TPM 137, instead of the hardware TPM 150. The transition between the use of the hardware TPM 150 and the software TPM 137 can occur via any number of mechanisms, and can include both full transitions, such that the hardware TPM is no longer used, and partial transitions, such that the hardware TPM 150 continues to be used to some extent, such as continuing to extend PCRs with measured values provided to it. The flow diagram 300 illustrates a full transition strictly for ease of illustration, and not due to any inherent limitations of either the hardware TPM 150 or the software TPM 137.

For example, in one embodiment, at step 335, a simple check can be made to determine if the software TPM 137 has begun executing and performing TPM functions. If it has not, then the measured value obtained at step 330 can be provided to the hardware TPM 150 and, at step 320, the hardware TPM can extend one or more PCRs with the measured value. The component that was measured at step 330 can then be executed or utilized at step 325 and, as part of its execution or utilization, it can measure the next component at step 330. In such a manner, until step 335 determines that the software TPM 137 is executing and ready to begin performing TPM functions, the hardware TPM 150 can continue to extend PCR values based on the measurements of the components being used or executed during the booting of the computing device 100.

Once step 335 determines that the software TPM 137 is executing and ready to begin performing TPM functions, the software TPM 137 can, at step 340, receive the measured value obtained at step 330, and extend one or more of its PCRs with the measured value. In addition, the software TPM 137 can, at step 340, add the measured value, representing a hash of the measured component, to a log. Such a log can, optionally, contain other information that can either be generated by the software TPM 137, or it can be received by the software TPM from external sources.

The component that was measured at step 330 can proceed to be utilized or executed at step 345 and, as part of its execution or utilization, it can measure the next component to be utilized or executed at step 355 if it is determined, at step 350, that there are other components that remain to be utilized or executed. If no other such components remain, the booting process can end at step 360. Subsequent to the measuring of the next component at step 355, processing can return to step 340 with the provision of that measured value to the software TPM 137, and the extension, by the software TPM, of one or more PCR values with that measured value.

As can be seen, in the embodiment illustrated by the flow diagram 300, a series of components can be utilized or executed, with each component measuring the next component to be utilized or executed, thereby providing, to a TPM, a continuous stream of measurement values that represent all of the components being utilized or executed during the booting of the computing device 100. If the software TPM 137 has not yet started executing and performing TPM functions, the measured values can be provided to the hardware TPM 150, as indicated by the loop comprising steps 320, 325, 330 and 335. Conversely, if the software TPM 137 has started executing and performing TPM functions, the measured values can be provided to it instead, as indicated by the loop comprising steps 340, 345, 350 and 355.

Again, as indicated previously, the embodiment illustrated in FIG. 3 shows, for illustrative simplicity only, a complete transition of the performance of TPM functions between the hardware TPM 150 and the software TPM 137 once the software TPM was determined to be executing and capable of performing such functions. In an alternative embodiment, the hardware TPM 150 can continue to receive measurements of components used or executed during the boot process even after the software TPM 137 is executing. For example, step 340 could comprise, not only the extension of software PCRs maintained by the software TPM 137, but also extension of the hardware PCRs maintained by the hardware TPM 150.

Because the computer-executable instructions that comprise the software TPM 147 originally reside on a storage device, such as the hard disk drive 141, before they are loaded into memory 130 as an executing instance of the software TPM 137, they can be subject to modification or other unauthorized access. Consequently, in one embodiment, verification of the computer-executable instructions that comprise the software TPM 147 can be performed using the capabilities of the hardware TPM 150. For example, the computing device 100 can be booted into a known safe state, with the software TPM 137 having been properly loaded into memory 130 from known good data and computer-executable instructions representing the software TPM 147 on the hard disk drive 141. The storage key of the software TPM 137 can then be provided to the hardware TPM 150 to be sealed based on the values of one or more of the hardware PCRs, as maintained by the hardware TPM 150, which uniquely represent that known good state of the computing device 100 and the software TPM 137. As will be known by those skilled in the art, the storage key of the software TPM 137 can enable the software TPM to decrypt, with that storage key, the other keys and secrets that it can use during its operation, including one or more private keys, one or more symmetric keys, various passwords, and other such protected information.

In one embodiment, the hardware PCRs to whose values the software TPM's storage key is sealed can be selected by the software TPM 137 or another entity. To minimize the chances of the storage key not being unsealed due to a change in a PCR value that does not have direct relevance to the software TPM 137, the hardware PCRs to whose values the TPM's storage key is sealed can be selected to be only those hardware PCRs that were only extended by measurements of components of the software TPM 147. Alternatively, the hardware PCRs to whose values the TPM's storage key is sealed can be selected to be only those hardware PCRs that were only extended by measurements of components of the software TPM 147 and any other relevant or related component.

Once the storage key of the software TPM 137 is sealed by the hardware TPM 150, the hardware TPM can return to the software TPM a block of information that represents the sealed storage key, which can be saved by the software TPM in non-volatile storage, such as the hard disk drive 141. Subsequently, after the computing device has been restarted, when the software TPM 137 is instantiated, it can provide this block of information to the hardware TPM 150 and request that the hardware TPM unseal its storage key. The storage key of the software TPM 137 can, thereafter, be provided to the software TPM by the hardware TPM 150 only if the computing device 100 is in the same known good state, as reflected by the values of the hardware PCRs as maintained by the hardware TPM from the moment the computing device was powered on or restarted. In such a manner, the software TPM 137 can only perform TPM operations if it has not been modified or otherwise changed from a known good state.

Figure 4:
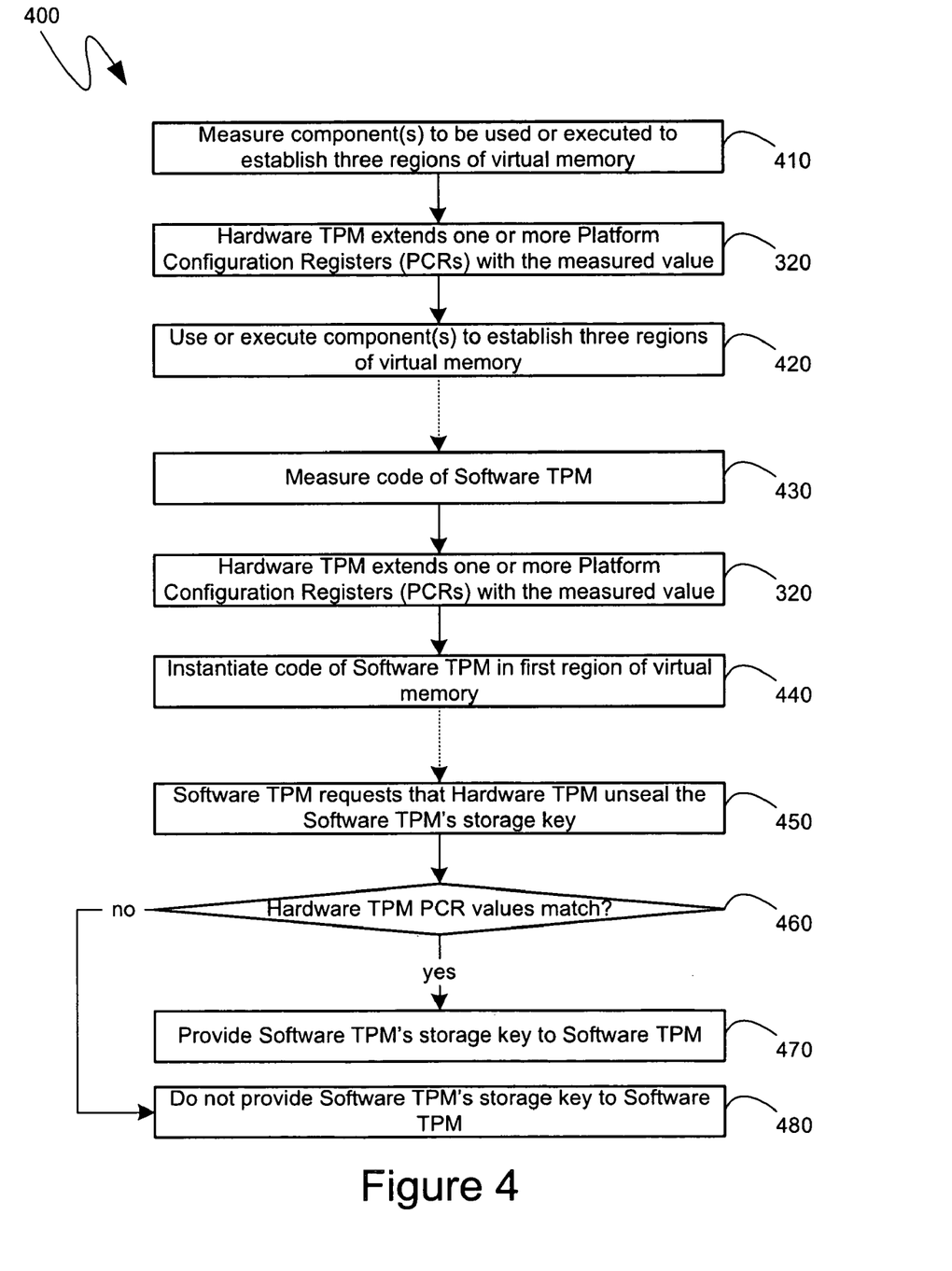
FIG. 4 is a flow diagram of an exemplary secure booting process establishing a software TPM.

Turning to FIG. 4, a flow diagram 400 is shown illustrating, in greater detail, one exemplary utilization of the hardware TPM 150 to ensure that the software TPM 137 has been generated in, and is currently executing in, a known good fashion. The flow diagram 400 of FIG. 4 illustrates an exemplary series of steps that can be performed as part of the performance of the loop of steps 320, 325, 330 and 335, wherein components used or executed during the boot process are measured and the measurements are provided to the hardware TPM 150 to enable the hardware TPM to extend PCRs in the manner described in detail above. More specifically, the flow diagram 400 illustrates the performance of steps 320, 325 and 330 in the specific instance of particular components relevant to the above described embodiments.

For example, at step 410, the measuring of components previously described with reference to step 330 can be performed specifically for the component or components that are used or executed to establish the regions of virtual memory, such as those described above with reference to memory segment diagram 200. In one embodiment, the components measured at step 410 can include the memory management unit 160. In another embodiment, the components measured at step 410 can include computer-executable instructions obtained from the ROM 131 or the hard disk drive 141.

The measured value or values obtained at step 410 can be provided to the hardware TPM 150 and, at step 320, as described previously, the hardware TPM can extend one or more PCRs with the measured values. The components that were measured at step 410 can then, at step 420, be utilized or executed to establish the regions of virtual memory, such as in the manner described above with reference to memory segment diagram 200.

In one embodiment, the component or components that were executed or utilized at step 420 can, in addition to establishing regions of virtual memory in the manner described, can also measure the computer-executable instructions of the software TPM 147, as they reside on the hard disk drive 141, or other storage medium. In such an embodiment, the execution of such instructions can occur immediately following the establishment of the regions of virtual memory. However, in an alternative embodiment, the execution of the computer-executable instructions that comprise the software TPM 147 can, instead, occur at a subsequent time. In such an embodiment, the computer-executable instructions of the software TPM 147, as they reside on the hard disk drive 141, or other storage medium, can instead be measured by the component that is utilized or executed immediately prior. To illustrate either such embodiment, flow diagram 400 indicates a dashed line between steps 420 and 430, indicating that one or more cycles of the steps 320, 325, 330 and 335 may occur between the performance of step 420 and the performance of step 430.

As shown, at step 430, the computer-executable instructions of the software TPM 147, as they reside on the hard disk drive 141, or other storage medium, can be measured, such as in the manner described above with reference to step 330. Subsequently, at step 320, as before, the measured values can be provided to the hardware TPM 150 to extend one or more PCRs with the measured value. The computer-executable instructions of the software TPM 147 can then be instantiated, at step 440, to form an executing, in-memory instance of the software TPM 137.

Once the software TPM 137 is executing, it can request that the hardware TPM 150 unseal the software TPM's storage key. In one embodiment, such a request can occur immediately after the software TPM 137 has been instantiated at step 440 while, in another embodiment, such a request can occur after the intermediate occurrence of one or more cycles of the steps 320, 325, 330 and 335. To illustrate such embodiments, the flow diagram 400 indicates a dashed line between steps 440 and 450, to indicate that they need not be performed in immediate succession.

When the hardware TPM 150 receives the request from the software TPM 137, issued in step 450, to unseal the software TPM's storage key, the hardware TPM can, at step 460, determine whether the PCR values that the hardware TPM has been maintaining comprise the same values as they did when the computing device 100, and, by inclusion, the software TPM, were in a known good state. If, at step 460, the hardware TPM 150 determines that the values of the PCRs are the same, it can unseal the storage key of the software TPM 137 and provide it to the software TPM at step 470. If, alternatively, the hardware TPM 150 determines that the PCR values are not the same, it cannot provide the software TPM's storage key at step 480. In such a manner, step 480 can prevent the software TPM 137 from operating unless it was instantiated in a known good state on a computing device, such as computing device 100, which has also been booted, at least up until that point, to a known good state.

As can be seen from the above descriptions, mechanisms for protecting a software TPM through a memory partitioning scheme have been presented, in addition to mechanisms for utilizing the hardware TPM to ensure that the software TPM so protected was instantiated into a known good state. In view of the many possible variations of the subject matter described herein, we claim as our invention all such embodiments as may come within the scope of the following claims and equivalents thereto.

We claim:

1. A method of protecting protected computer-executable instructions capable of executing on a computing device having virtual memory, the method comprising the steps of:
   partitioning the virtual memory into segments comprising: a first segment, a second segment and a third segment such that the first segment and the second segment overlap in a first overlap segment and such that second segment and the third segment overlap in a second overlap segment;
   establishing access rights that prevent computer-executable instructions executing from the third segment from accessing contents of the first segment and from modifying contents of the second segment and that prevent computer-executable instructions executing from the second segment from modifying contents of the first segment;
   loading the protected computer-executable instructions into the first overlap segment;
   loading the protected data into a first portion of the first segment external to the first overlap segment;
   loading, into the second segment, computer-executable instructions and data comprising an indirection table to the protected computer-executable instructions; and
   loading, into the third segment, computer-executable instructions that can utilize the protected computer-executable instructions via the indirection table.

2. The method of claim 1, wherein the protected computer-executable instructions and data comprise a software-based trusted platform module.

3. The method of claim 2 further comprising the steps of: providing, to a hardware trusted platform module of the computing device, a sealed version of a storage key of the software-based trusted platform module; and requesting that the hardware trusted platform module unseal the storage key.

4. The method of claim 3, wherein the sealed version of the storage key was sealed by the hardware trusted platform module with reference to only those platform configuration registers of the hardware trusted platform module whose values were exclusively based on measurements of components associated with the software-based trusted platform module.

5. The method of claim 1 further comprising the step of loading, into the third segment, computer-executable instructions that implement a tri-partied memory segmentation scheme for protecting information associated with the computer-executable instructions implementing the tri-partied memory segmentation scheme.

6. The method of claim 1, wherein the access rights are enforced by a hardware memory management unit.

7. A computer-readable storage medium, the computer-readable storage medium not being a signal, having computer-executable instructions for protecting protected computer-executable instructions capable of executing on a computing device having virtual memory, the computer-executable instructions performing steps comprising:
- partitioning the virtual memory into segments comprising: a first segment, a second segment and a third segment such that the first segment and the second segment overlap in a first overlap segment and such that the second and the third segment overlap in a second overlap segment;
- establishing access rights that prevent computer-executable instructions executing from the third segment from accessing contents of the first segment and from modifying contents of the second segment and that prevent computer-executable instructions executing from the second segment from modifying contents of the first segment; loading the protected computer-executable instructions into the first overlap segment; loading the protected data into a first portion of the first segment external to the first overlap segment;
- loading, into the second segment, computer-executable instructions and data comprising an indirection table to the protected computer-executable instructions; and
- loading, into the third segment, computer-executable instructions that can utilize the protected computer-executable instructions via the indirection table.

8. The computer-readable storage medium of claim 7, wherein the protected computer-executable instructions and data comprise a software-based trusted platform module.

9. The computer-readable storage medium of claim 8 having further computer-executable instructions performing steps comprising: providing, to a hardware trusted platform module of the computing device, a sealed version of a storage key of the software-based trusted platform module; and requesting that the hardware trusted platform module unseal the storage key.

10. The computer-readable storage medium of claim 9, wherein the sealed version of the storage key was sealed by the hardware trusted platform module with reference to only those platform configuration registers of the hardware trusted platform module whose values were exclusively based on measurements of components associated with the software-based trusted platform module.

11. The computer-readable storage medium of claim 7 having further computer-executable instructions for loading, into the third segment, computer-executable instructions that implement a tri-partied memory segmentation scheme for protecting information associated with the computer-executable instructions implementing the tri-partied memory segmentation scheme.

12. The computer-readable storage medium of claim 7, wherein the access rights are enforced by a hardware memory management unit.

13. A computing device comprising:
- a computer-readable storage medium, the computer-readable storage medium not being a signal, supporting a virtual memory range that is partitioned into a first segment comprising protected computer-executable instructions and data, a second segment comprising computer-executable instructions and data comprising an indirection table to the protected computer-executable instructions, and a third segment comprising computer-executable instructions that can utilize the protected computer-executable instructions via the indirection table; and an access rights enforcement mechanism that prevent computer-executable instructions executing from the third segment from accessing contents of the first segment and from modifying contents of the second segment and that prevent computer-executable instructions executing from the second segment from modifying contents of the first segment;
  - wherein the first segment and the second segment overlap in a first overlap segment and the second segment and the third segment overlap in a second overlap segment; and
- wherein further the first overlap segment comprises the protected computer-executable instructions and a first portion of the first segment external to the first overlap segment comprises the protected data.

14. The computing device of claim 13, wherein the protected computer-executable instructions and data comprise a software-based trusted platform module.

15. The computing device of claim 14, wherein the computer-executable instructions comprising the software-based trusted platform module perform steps comprising:
- providing, to a hardware trusted platform module of the computing device, a sealed version of a storage key of the software-based trusted platform module; and requesting that the hardware trusted platform module unseal the storage key.

16. The computing device of claim 15, wherein the sealed version of the storage key was sealed by the hardware trusted platform module with reference to only those platform configuration registers of the hardware trusted platform module whose values were exclusively based on measurements of components associated with the software-based trusted platform module.

17. The computing device of claim 13, wherein the third segment further comprises computer-executable instructions that implement a tri-partied memory segmentation scheme for protecting information associated with the computer-executable instructions implementing the tri-partied memory segmentation scheme.

* * * * *